June 8, 1926.  
J. H. SHAW  
1,587,867  
LOCK FOR GEAR SHIFT LEVERS AND THE LIKE  
Filed Nov. 21, 1919 2 Sheets-Sheet 1
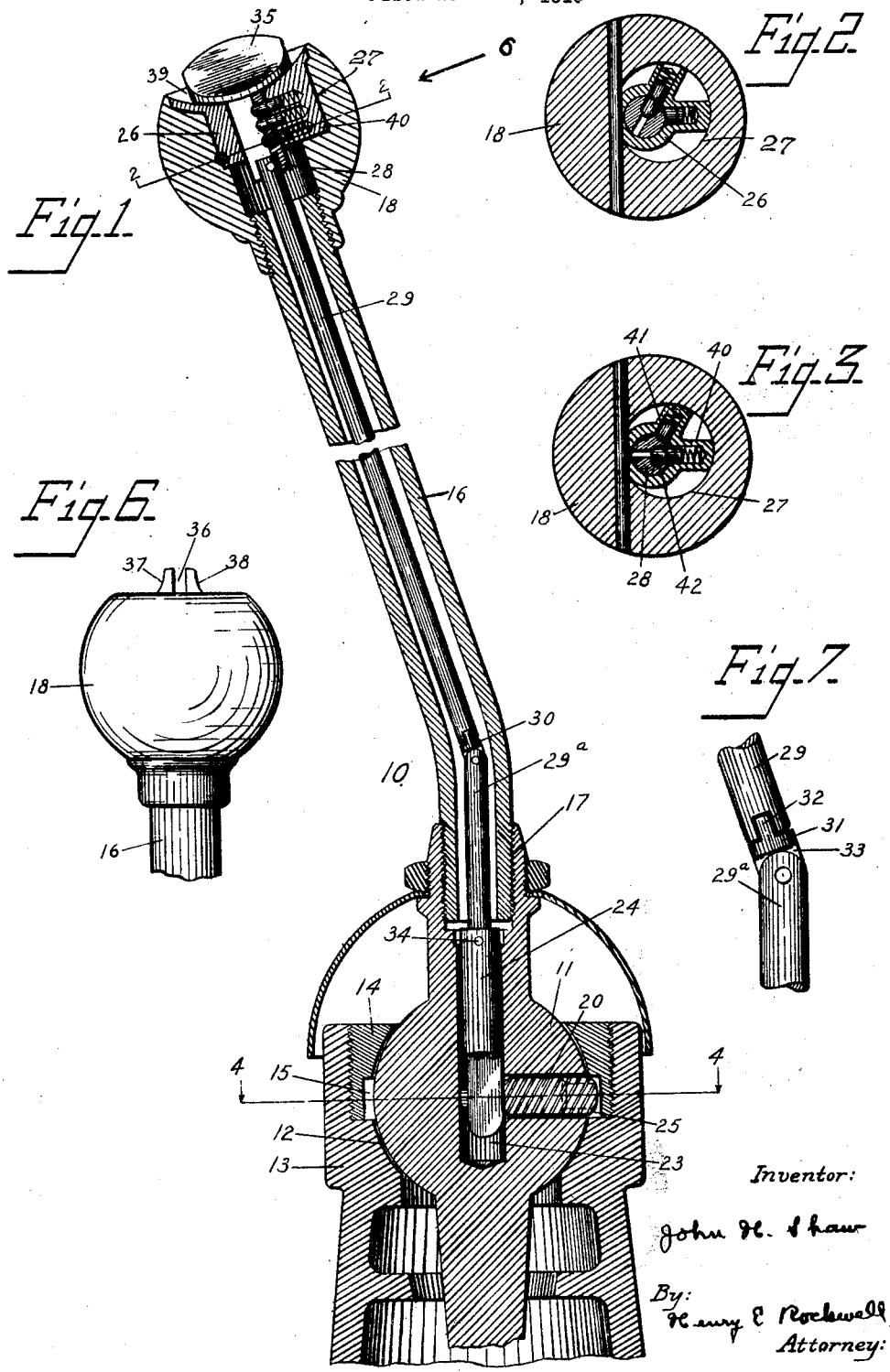
Inventor:  
John H. Shaw  
By: Henry E. Rockwell  
Attorney June 8, 1926.

1,587,867

J. H. SHAW

LOCK FOR GEAR SHIFT LEVERS AND THE LIKE

Filed Nov. 21, 1919   2 Sheets-Sheet 2

Inventor:
John H. Shaw
By: Henry E. Rockwell
Attorney.

Patented June 8, 1926.

1,587,867

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

Application filed November 21, 1919. Serial No. 339,537.

This invention relates to a lever lock and particularly to a key operable locking device for locking the gear shift lever of an automobile against unauthorized manipulation. One object of my invention is to provide very strong and durable locking means housed entirely within a gear shift lever for locking the same in its neutral position.

Another object of my invention is to provide a gear shift lever or the like with locking bolts mounted therein, and so constructed that a slight movement of the gear shift lever serves to retract these bolts from their locking position when the same are no longer held in this position by the operating means.

Another object of my invention is to provide coupling means operable within the bent portion of a hollow gear shift lever to form an operating connection between the lever locking mechanism and the lock mounted at the upper end of the gear shift lever.

Still another object of my invention is to improve the construction of the key barrel of the cylinder lock in order that the outer end of this key barrel may be readily grasped between the fingers to rotate the same.

To these and other ends the invention consists in the novel features and combinations of parts to be hereinafter described and claimed.

In the accompanying drawings:

Fig. 1 is a vertical sectional view through a gear shift lever and its supporting bearing member having my invention applied thereto, the parts being shown in locked position.

Fig. 2 is a sectional view taken on the line 2—2 of Fig. 1, showing the key barrel in its unlocked position.

Fig. 3 is a view similar to Fig. 2 showing the key barrel in its locked position.

Fig. 6 is a side view of the knob upon the upper end of the gear shift lever looking in the direction of the arrow 6 in Fig. 1; and Fig. 7 is an enlarged view of a detail of my invention.

Figure 4:
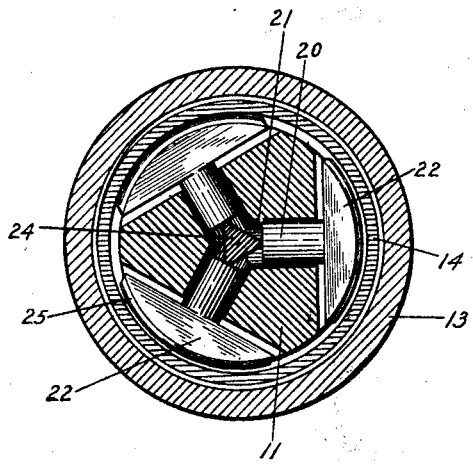
Fig. 4 is a sectional view taken on the line 4—4 of Fig. 1, showing the sliding bolts within the spherical bearing member in their locked position.

In the embodiment of my invention illustrated in the drawings, I have designated by the numeral 10 a gear shift lever of the universal swinging type, the same preferably being bent axially in order that it may be more conveniently operated by the person driving the automobile in which the same is provided.

An intermediate portion of this lever is preferably provided with a spherical bearing member 11, which is seated in a substantially spherical socket 12 formed within the bracket member 13. The spherical bearing member 11 is retained properly seated in its socket by means of a threaded ring or gland nut 14, and the lower portion of this gland nut is preferably provided with an annular recess 15. The upper portion of the gear shift lever 10 is preferably constructed of a hollow piece of tubing 16, the lower end of which is screwed into a threaded socket formed adjacent the bearing member 11 of the gear shift lever, as indicated by 17. The upper end of the tube 16 is also threaded to receive the lever operating knob 18. The tube 16 is preferably constructed of hardened steel in order to better withstand the strains to which the same may be subjected and also to resist the action of a cutting instrument that may be used in an effort to saw through this tube to thereby attack the locking mechanism of the gear shift lever.

Figure 5:
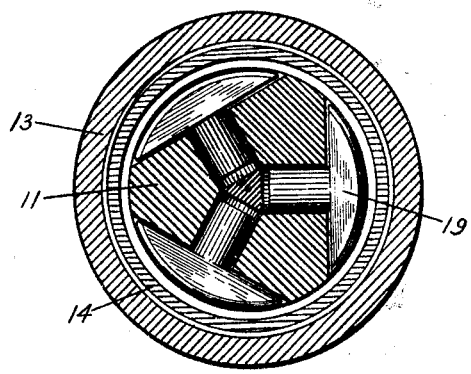
Fig. 5 is a view similar to Fig. 4, but showing these bolts in their unlocked position.

The means which I have provided for locking the gear shift lever 10 to its bracket member 13 consists of a plurality of bolts 19 slidably mounted within the spherical bearing member (three being shown in the device illustrated), as shown in Figs. 1, 4 and 5. These bolts preferably consist of round pins 20 slidably mounted in radially extending drill-holes 21 and upon the outer ends of the portion 20 of these bolts are formed laterally extending portions comprising the heads 22, with the outer face of these heads rounded to conform to the curvature of the recess or groove 15 in which these heads are adapted to be inserted. The pins 20 with the heads 22 formed thereupon are somewhat T-shape in appearance. In order to provide means for forcing the bolts 19 outwardly to thereby move the heads 22 into the groove 15, I form a drill-hole axially within the gear shift lever 10, as indicated by 23, and in this drill-hole is rotatably mounted a bolt or pin 24, the lower portion of which is triangular in cross-section, as shown in Figs. 4 and 5, the arrangement being such that when this bolt 24 is rotated to the position shown in Fig. 4, the locking bolts 19 are forced outwardly into locking engagement with recess 15, and when this bolt 24 is turned to the position shown in Fig. 5, the locking bolts 19 are free to move inwardly out of their locking position. In order to prevent the locking bolts 19 from remaining in their extended position and thereby preventing the operation of the gear shift lever 10 after the operating bolt 24 has been turned to its unlocked position, the rounded portion of the heads 22 of these bolts preferably have the edges thereof beveled, as indicated at 25, and these beveled faces are positioned to cooperate with the upper and lower walls formed by the groove 15, so that when a slight force is exerted upon the lever 10 to shift the same, this force by means of the beveled edges 25 will force the locking bolts 19 inwardly to their unlocked position.

In order to provide means for moving the locking bolts 19 to their extended position and for retaining the same in this position I have mounted a pin tumbler lock 26 in the upper end of the knob 18, a cylindrical socket 27 being preferably formed in the upper end of this knob in which the cylinder lock is secured by a transversely extending pin, as shown. This socket 27 is preferably formed eccentrically with respect to the longitudinal axis of the knob, so that the key barrel 28 within the cylinder lock will lie in alignment with the axis of the hollow tube 16, so that this key barrel may be operatively secured to the bolt 24 by means of the rod 29, and in order that the bend within the hollow tube 16 will not interfere with the free rotation of the rod 29, a universal joint 30 is provided within the tube at this bend. This universal joint, as shown more particularly in Fig. 7, consists preferably of the connecting member 31 having the upwardly projecting wing 32 and the downwardly projecting wing 33, these wings being arranged to extend at right angles to each other with one wing pivotally secured to the lower end of the rod 29, while the other wing is pivotally secured to the upper end of the rod 29ª. The lower end of the rod 29ª is rigidly secured to the bolt 24 by any preferred means such as a pin 34, while the upper end of the rod 29 is secured to the key barrel by a similar pin.

In order that the key barrel 28 may be rotated to move the sliding bolts 20 outwardly into their locking position without the use of a key, I have formed an enlarged head 35 upon the outer end of this key barrel, and in order that this head 35 may be more readily grasped between the fingers, I have cut away this head upon each side of the key slot 36 to thereby form the substantially flat faces 37 and 38. The outer end or escutcheon plate of the pin tumbler lock is preferably dished out, as indicated at 39, in order to form a clearance space in which the head 35 operates, and also in order that a firmer grasp may be had upon the head of the key barrel.

As is well known, in most types of pin tumbler locks, the key cannot be removed from its lock except when the key barrel is turned to its locked position, since this is usually the only position in which the pin tumblers are free to move outwardly sufficiently to clear the teeth of the key when the same is withdrawn from its key barrel. In order to provide means whereby the key may be withdrawn from its key barrel when the same is turned to its unlocked position and then the key barrel may be rotated from its unlocked to its locked position without the use of a key, I have provided the pin tumbler extensions 40 and 41. In the extension 40 are mounted the pin tumblers which cooperate with the key barrel in the usual manner to lock the same against rotation, and in the extension 41 are provided another set of pin tumblers which operate differently from the usual pin tumblers in that they serve to frictionally hold the key barrel in its unlocked position and also to force the pin tumblers 42 into the key barrel after the key has been withdrawn from the same, the arrangement being such that after the key barrel has been turned to its unlocked position to thereby rotate the operating bolt 24 to the position shown in Fig. 5, the key may be removed, and when desired, the key barrel may be rotated from its unlocked to its locked position without the use of a key by merely grasping the knob 35 between the fingers and rotating the same to the locked position. The particular construction and operation of the mechanism within the pin tumbler lock 26 forms no part of my invention, as the same is described and claimed in the Voight application, Serial No. 304,449, filed June 16, 1919.

From the above description when read in connection with the drawings, it will be seen that I have provided a strong, durable locking device for gear shift levers, which device cannot be readily injured or rendered inoperative by anyone attempting to operate the gear shift lever without the key required to unlock the same. It will be seen that when the key barred 28 has been rotated to its locked position, as shown in Fig. 1, the three locking bolts 20 will be forced outwardly so that the heads 22 will be seated in the annular groove 15 to thereby firmly lock the gear shift lever 10 in its neutral position. When it is desired to unlock the gear shift lever, all that is necessary is to insert a proper key in the key barrel and rotate the same through a small angle to thereby rotate the bolt 24 from the position shown in Fig. 4 to that shown in Fig. 5, whereupon the sliding bolts 19 will move inwardly to their inoperative position as soon as a slight movement is imparted in any direction to the gear shift lever, this inward movement being produced by the beveled edges 25 being brought into engagement with the upper or lower edge formed by the annular groove 15.

What I claim is:

1. In combination with an operating lever provided with a spherical bearing member, a supporting bracket in which said bearing member is movably mounted, means for locking said lever to said bracket, comprising a plurality of bolts having substantially T-shaped heads, said bolts slidably mounted within said spherical bearing member with the heads thereof movable into locking engagement with said bracket, key-controlled means for retaining said bolts in their extended position, said bolt heads provided with beveled edges constructed to cooperate with said supporting bracket to retract said bolt by the movement of said lever.

2. In combination with a movable lever, a bearing member in which said lever is fulcrumed, means for locking said lever to said bearing member, comprising a plurality of bolts having laterally extending heads, said bolts carried by said lever with the heads thereof movable into locking engagement with said bearing member, key means for retaining said bolts in their locking position, and beveled edges upon said heads positioned to retract said bolt by the movement of said lever.

3. In combination with a movable lever, a bearing member in which said lever is fulcrumed, means for locking said lever to said bearing member, comprising a plurality of bolts having laterally extending heads, said bolts carried by said lever with the heads thereof movable into locking engagement with said bearing member, key means for retaining said bolts in their locked position, and means including a beveled edge adjacent the outer ends of said bolts for retracting the same by the movement of said lever.

4. In combination with a movable lever, a bearing member in which said lever is fulcrumed, means for locking said lever to said bearing member, comprising a plurality of bolts having laterally extending heads, said bolts carried by said lever with the heads thereof movable into locking engagement with said bearing member, key means for retaining said bolts in their locked position, and means for imparting a retracting movement to said bolts upon moving said lever.

5. In combination with a hollow bent lever, a key controlled lock including a rotatable key barrel mounted within the upper end of said lever, locking mechanism mounted within the lever below the bent portion of the same, including a rotatable actuating member and a rod mounted within the lever, the rod secured to and non-rotatably connecting the key barrel, and the said actuating member, said rod having a universal joint formed in the same adjacent the bent portion of the lever.

6. In a locking device for a gear shift lever or the like having a relatively large knob upon one end thereof, locking means for said lever including a lock mounted within said knob, and provided with a key barrel, said knob having its outer end dished out to form a clearance space about the outer end of the key barrel, and said key barrel having the lateral faces of its outer end cut away to increase the clearance between the same and the dished-out portion of said knob, to thereby permit the flattened faces of said key barrel to be readily grasped between the fingers to rotate the same.

7. In a locking device for a gear shift lever or the like, the lever being movably mounted upon a supporting bracket, means for locking said lever against movement including a rod rotatably mounted within said lever, a member connected to said rod and projecting without said lever, the projecting portion of said member having its opposite faces flattened whereby it may be grasped by the fingers and a locking device to lock said rod against said movement.

8. In a locking device for a gear shift lever or the like, the lever being movably mounted upon a supporting bracket, means for locking said lever against movement including a rod rotatably mounted within the lever and a cylinder lock mounted at the upper end of the lever, said lock including a key barrel connected to said rod and projecting without said lever, the projecting portion of the barrel having its opposite faces flattened whereby it may be grasped by the fingers, and cooperating locking means associated with the barrel and lock cylinder.

9. In a locking device for a gear shift lever or the like, the lever being movably mounted upon a supporting bracket, means for locking said lever against movement including a rod rotatably mounted within said lever, a member connected to said rod and projecting without said lever, the projecting portion of said member having its opposite faces flattened whereby it may be grasped by the fingers, and locking means associated with said member to lock it and thereby lock said rod in a predetermined position.

In witness whereof, I have hereunto set my hand on the 20th day of November, 1919.

JOHN H. SHAW.